US010332239B2

(12) United States Patent
Guo et al.

(10) Patent No.: US 10,332,239 B2
(45) Date of Patent: Jun. 25, 2019

(54) APPARATUS AND METHOD FOR PARALLEL POLYPHASE IMAGE INTERPOLATION

(71) Applicant: Institute of Automation Chinese Academy of Sciences, Beijing (CN)

(72) Inventors: Ruoshan Guo, Beijing (CN); Lei Wang, Beijing (CN); Rui Han, Beijing (CN); Chen Lin, Beijing (CN); Donglin Wang, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/557,086

(22) PCT Filed: Jun. 12, 2015

(86) PCT No.: PCT/CN2015/081386
§ 371 (c)(1),
(2) Date: Sep. 9, 2017

(87) PCT Pub. No.: WO2016/197393
PCT Pub. Date: Dec. 15, 2016

(65) Prior Publication Data
US 2018/0108113 A1  Apr. 19, 2018

(51) Int. Cl.
*G06T 1/60* (2006.01)
*G06T 3/40* (2006.01)
(52) U.S. Cl.
CPC ........... *G06T 3/4007* (2013.01); *G06T 1/60* (2013.01); *G06T 3/40* (2013.01); *G06T 3/4053* (2013.01); *G06T 2210/52* (2013.01)
(58) Field of Classification Search
CPC ...... H04N 9/093; H04N 5/217; H04N 19/176; H04N 19/12
(Continued)

(56) References Cited

U.S. PATENT DOCUMENTS 7,003,037 B1 * 2/2006 Bordes .................. H04N 19/63
375/240.16
7,477,323 B2 * 1/2009 Chou .................... G06T 3/4007
348/581
(Continued)

FOREIGN PATENT DOCUMENTS

| CN | 101217620 A | 7/2008 |
| CN | 101242541 A | 8/2008 |
| CN | 104935831 A | 9/2015 |

OTHER PUBLICATIONS

PCT/CN2015/081386 International Search Report.

*Primary Examiner* — Yosef Kassa
(74) *Attorney, Agent, or Firm* — Jeremy Howard; Howard IP Law, PLLC

(57) ABSTRACT

The present invention provides apparatus and method for parallel polyphase image interpolation. The apparatus comprises: a local memory, a first memory access control unit, a second memory access control unit, a source image data buffering unit, a filter coefficient buffering unit, a multiply-accumulator, a third memory access control unit and a state machine; the first memory access control unit is configured for obtaining source image data from the local memory and buffering them into a source image data buffering unit; the second memory access control unit is configured for obtaining filter coefficients from the local memory and buffering them into a filter coefficient buffering unit; the source image data buffering unit is configured for inputting source image data to each multiply-accumulator, the filter coefficient buffering unit is configured for broadcasting filter coefficients corresponding to the source image data to the multiply-accumulators; and the multiply-accumulator is configured for performing multiply-accumulation operation on the source image data and the filter coefficients, and outputting the multiply-accumulation result every F clocks. The inter-
(Continued)

polation apparatus of the present invention is reconfigurable and can support interpolation filters with any order, so it is universal.

10 Claims, 14 Drawing Sheets

(58) Field of Classification Search
USPC .............. 382/255, 260, 274, 275, 282, 305; 358/525, 537, 538, 463
See application file for complete search history.

(56) References Cited

U.S. PATENT DOCUMENTS

| | | | | |
|---|---|---|---|---|
| 7,885,487 B2* | 2/2011 | Ku | ........................... | G06T 3/403 |
| | | | | 348/441 |
| 8,107,775 B2* | 1/2012 | Onomura | ............. | H04N 5/3458 |
| | | | | 345/538 |
| 8,363,123 B2* | 1/2013 | Inaba | .................... | G06T 3/4015 |
| | | | | 348/222.1 |
| 8,723,983 B2* | 5/2014 | Shiohara | ................ | H04N 5/217 |
| | | | | 348/221.1 |
| 2007/0104394 A1 | 5/2007 | Chou | | |
| 2007/0230812 A1 | 10/2007 | Ku | | |
| 2008/0193049 A1 | 8/2008 | Onomura | | |

* cited by examiner

APPARATUS AND METHOD FOR PARALLEL POLYPHASE IMAGE INTERPOLATION

TECHNICAL FIELD

The present invention relates to the field of image and video processing, in particular to apparatus and method for parallel polyphase image interpolation.

BACKGROUND

In the display of digital television, tablet or computer, there is a frequent need to change the resolution of image. For example, in a full HD digital TV, the video input source may have a standard definition or a high definition, and in order to display on a full HD television screen, images need to be scaled up. The polyphase interpolation method is a commonly used image scaling method, which has better performance in terms of detail preservation as compared to bilinear interpolation and bicubic interpolation methods, so it is more widely used in the industry.

The interpolation of two-dimensional images can be divided into horizontal interpolation and vertical interpolation, for example, in order to scale up an image of 720×480 into 1920×1080, the image may be first vertically scaled up to 720×1080 and then horizontally scaled up to 1920×1080. The filters used for horizontal interpolation and vertical interpolation may have different taps, and multiple rows of pixels need to be buffered on a chip in order to realize vertical data buffering, so the hardware cost for vertical interpolation is higher than that for horizontal interpolation, and a shorter interpolation filter is usually used in the vertical direction than the horizontal direction in practice. For two-dimensional image interpolation, a conventional circuit with fixed 8-tap (7 order) horizontal filters and 6-tap (5 order) vertical filters is used, whose structural diagram is as shown in FIG. 7-$a$) wherein the circuit design of a 6-tap filter is as shown in FIG. 7-$b$), and the circuit design of a 8-tap filter is as shown in FIG. 7-$c$). It can be seen that filters with different orders have different circuits. In polyphase interpolation, polyphase filters with different orders usually have different performances, and generally speaking, a filter with a higher order means better detail preservation capability, but it also results in the side effects of overshoot and ringing. A polyphase filter with a lower order is not as good as a filter with a higher order in terms of detail preservation capability, but it is better in terms of the side effects of overshoot and ringing. For images having different characteristics, using adaptive filters with different orders can usually achieve better performance than using a fixed single filter. For example, for natural images, using filters with higher orders can achieve better performance, while for graphics, using filters with lower orders can achieve better performance.

In the existing interpolation apparatus, filters suitable for different image types have different orders, while filters with different orders corresponding to different structures, so, in order to select different filters adaptively according to the image characteristics, various interpolation circuits need to be included simultaneously in the conventional circuit design, which cause certain waste of hardware resource. When the chip is taped out, the chip designed only supports a limited number of fixed interpolation filter orders, and the order of the filters cannot be changed, so if the algorithm is changed, the associated hardware has to be re-designed and taped out.

SUMMARY OF THE INVENTION

The present invention provides an apparatus and method for parallel polyphase image interpolation to solve the problem of the existing interpolation apparatus or method which is not universal and needs to change the hardware circuit for images of different characteristics.

A first aspect of the present invention is to provide an apparatus for parallel polyphase image interpolation, which comprises:

a local memory for storing source image data and filter bank coefficients and destination image data;

a first memory access control unit for obtaining F rows with P pixels per row of source image data from the local memory and buffering the F rows of source image data into a source image data buffering unit;

a second memory access control unit for obtaining F filter coefficients from the local memory and buffering the F filter coefficients into a filter coefficient buffering unit; the source image data buffering unit is configured for inputting P pixels of a $f^{th}$ row of source image data to P multiply-accumulators respectively in a $k^{th}$ clock cycle;

the filter coefficient buffering unit is configured for broadcasting a $f^{th}$ filter coefficient corresponding to the $f^{th}$ row of source image data to P multiply-accumulators in the $k^{th}$ clock cycle;

the multiply-accumulator is configured for performing multiply-accumulation operation on the $f^{th}$ row of source image data in the $k^{th}$ clock cycle according to the $f^{th}$ filter coefficient, and outputting the multiply-accumulation result and reset the accumulation register when f=F;

a third memory access control unit for obtaining the multiply-accumulation result and storing it into the local memory;

a state machine for outputting control signals to the first memory access control unit, the second memory access control unit, the third memory access control unit, the source image data buffering unit, and the interpolation filter coefficient buffering unit; wherein, $k \geq 1$, $f \geq 1$, $P>1$, $1 \leq f \leq F$.

A second aspect of the present invention is to provide a method for parallel polyphase image interpolation, which comprises:

obtaining F rows with P pixels per row of source image data from the local memory and buffering the F rows of source image data into a source image data buffering unit by a first memory access control unit;

obtaining F filter coefficients from the local memory and buffering the F filter coefficients into a filter coefficient buffering unit by a second memory access control unit;

inputting, by the source image data buffering unit, P pixels of a $f^{th}$ row of source image data to P multiply-accumulators respectively in a $k^{th}$ clock cycle;

broadcasting, by the filter coefficient buffering unit, a $f^{th}$ filter coefficient corresponding to the $f^{th}$ row of source image data to P multiply-accumulators in the $k^{th}$ clock cycle;

performing, by the multiply-accumulator, multiply-accumulation operation on the $f^{th}$ row of source image data in the $k^{th}$ clock cycle and the $f^{th}$ filter coefficient, and outputting the multiply-accumulation result and reset the accumulation register when f=F;

obtaining, by a third memory access control unit, the multiply-accumulation result and storing it into the local memory;

determining if f+1 ≤ F, if yes, adding 1 to f and repeating the operation to the $f^{th}$ row until f+1>F, and obtaining the multiply-accumulation result of the $k^{th}$ clock cycle as the interpolation result of P destination image pixels;

wherein, k ≥ 1, F ≥ 1, 1 ≤ f ≤ F.

Repeat the said processing for P destination image pixels until all the destination image pixels are processed.

The advantageous effects of the present invention are as follows:

The apparatus for parallel polyphase image interpolation according to the present invention supports polyphase filters with any order, and it can realize re-construction of the interpolation apparatus only by re-configuring the hardware without changing the hardware, thereby realizing interpolation scaling of images of different characteristics, namely, a reconfigurable apparatus for parallel polyphase image interpolation is realized, which can meet the needs for different application scenarios. Specifically, first of all, said apparatus has only one circuit structure and can support interpolation filters with any order, and the same circuit structure can be multiplexed at different time for different images; secondly, said apparatus can be used to application scenarios having different needs by only changing the configuration without changing the hardware; finally, said apparatus can realize image transpose with zero overhead by means of a two-dimensional discrete memory, thus the horizontal interpolation and vertical interpolation circuits can be multiplexed.

BRIEF DESCRIPTION OF THE DRAWINGS

FIG. 9-b) is a schematic drawing of interpolated image pixels;

FIG. 9-c) is a schematic drawing of the processing sequence of the interpolation data;

FIG. 9-d) is a schematic drawing of the accessing sequence of the source image data;

DETAILED DESCRIPTION OF THE INVENTION

Figure 1:
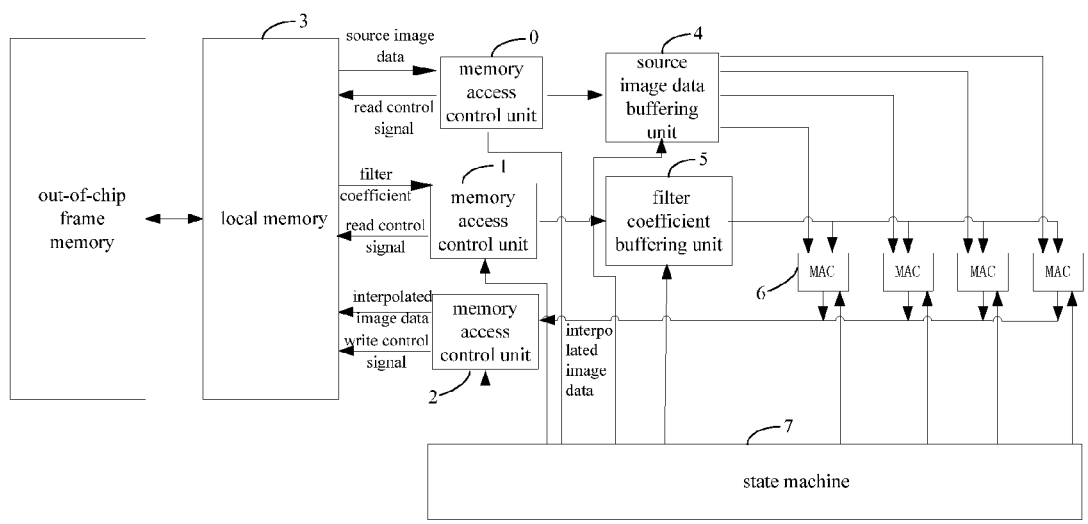
FIG. 1 is a structural block diagram of embodiment 1 for the apparatus for parallel polyphase image interpolation according to the present invention.

FIG. 1 is a structural block diagram of embodiment 1 for the apparatus for parallel polyphase image interpolation according to the present invention. As shown in FIG. 1, the apparatus for parallel polyphase image interpolation according to the present invention comprises:

a local memory 3 for storing source image data and filter coefficients and destination image data;

a first memory access control unit 0 for obtaining F rows of source image data from the local memory and buffering them into a source image data buffering unit;

a second memory access control unit 1 for obtaining F filter coefficients from the local memory and buffering them into a filter coefficient buffering unit;

a source image data buffering unit 4 for inputting P pixels of a $f^{th}$ row of source image data to P multiply-accumulators respectively in a $k^{th}$ clock cycle;

a filter coefficient buffering unit 5 for broadcasting a $f^{th}$ filter coefficient corresponding to the $f^{th}$ row of source image data to P multiply-accumulators in the $k^{th}$ clock cycle;

a multiply-accumulator 6 for performing multiply-accumulation operation on the $f^{th}$ row of source image data in the $k^{th}$ clock cycle according to the $f^{th}$ filter coefficient and outputting the multiply-accumulation result and reset the accumulation register when f=F;

a third memory access control unit 2 for obtaining the multiply-accumulation result and storing it into the local memory;

a state machine 7 for outputting control signals to the first memory access control unit, the second memory access control unit, the third memory access control unit, the source image data buffering unit, and the interpolation filtering and buffering unit;

wherein, k ≥ 1, F ≥ 1, 1 ≤ f ≤ F.

Preferably, the local memory is further used for calculating coordinates of the image data to be interpolated to generate F rows of source image data and for calculating all the filter coefficients needed for interpolation in local memory which form a interpolation filter coefficient table and storing them. The first memory access control unit is further used for calculating the address of the source image data in the local memory, and reading the source image data; The second memory access control unit is used for calculating the address of the F filter coefficients in the local memory and reading the filter coefficients.

Preferably, the local memory is further used for calculating coordinates of the image data to be interpolated according to a simplest scaling ratio to generate F rows of source image data and for calculating all the filter coefficients needed for interpolation in local memory which form a interpolation filter coefficient table and storing them; The interpolation filter coefficient table has L table entries and each entry corresponds to a filter with F coefficients. L is the output factor of a simplest scaling ratio, and F is the number of taps of each filter, and filters are arranged in an order of the interpolation time when the filter is used; The first memory access control unit is further used for calculating the address of the source image data in the local memory according to a coordinate update table, and reading the source image data; The second memory access control unit 1 is further used for calculating the address of the F filter coefficients in the local memory according to the interpolation time when the filter is used, and reading the filter coefficients.

Preferably, the local memory is a two-dimensional discrete memory, which does not need to perform transpose operation on the source image data, thus it reduces the time for interpolation operation as compared to the conventional interpolation apparatus.

Preferably, the first memory access control unit, the second memory access control unit or the third memory access control unit comprises at least one counter, at least one multiplier, at least one adder and at least one configuration register.

Preferably, the source image data buffering unit comprises at least one counter, at least one adder, at least one register bank and at least one configuration register.

Preferably, the filter coefficient buffering unit comprises at least one counter, at least one NOT gate and at least one register bank.

The apparatus for parallel polyphase image interpolation as disclosed in the present invention comprises a two-dimensional discrete local memory for storing source image data, groups of filter coefficients, and interpolated image data; a state machine for generating control signals for controlling respective units; a memory access control unit 0 for reading the source image data in the local memory into a data buffering unit; a memory access control unit 1 for reading the filter coefficients in the local memory into an interpolation filter coefficient buffering unit; a data buffering area for buffering F rows of source image data needed for interpolating one row of images (F being the number of taps of the interpolation filter, which is reconfigurable), each clock cycle outputting a row of source image data with a row width of P pixels, which are input into P multiply-accumulators (MAC), respectively; an interpolation filter coefficient buffering unit for buffering F filter coefficients needed for interpolating a row of data, each clock cycle outputting one filter coefficient and broadcasting it to P multiply-accumulators; P multiply-accumulators for receiving input image data and filter coefficients to perform multiply-accumulation operation, and every F clock cycles outputting a row of P interpolation results; a memory access control unit 2 for writing the output from the multiply-accumulator (MAC) back to the local memory. Said apparatus for parallel polyphase image interpolation can simultaneously and parallelly process the interpolation of P pixels and can reconfigure the order of the interpolation filter, so it can be applied to application scenarios with different needs by only modifying the configuration without changing the hardware.

Figure 3:
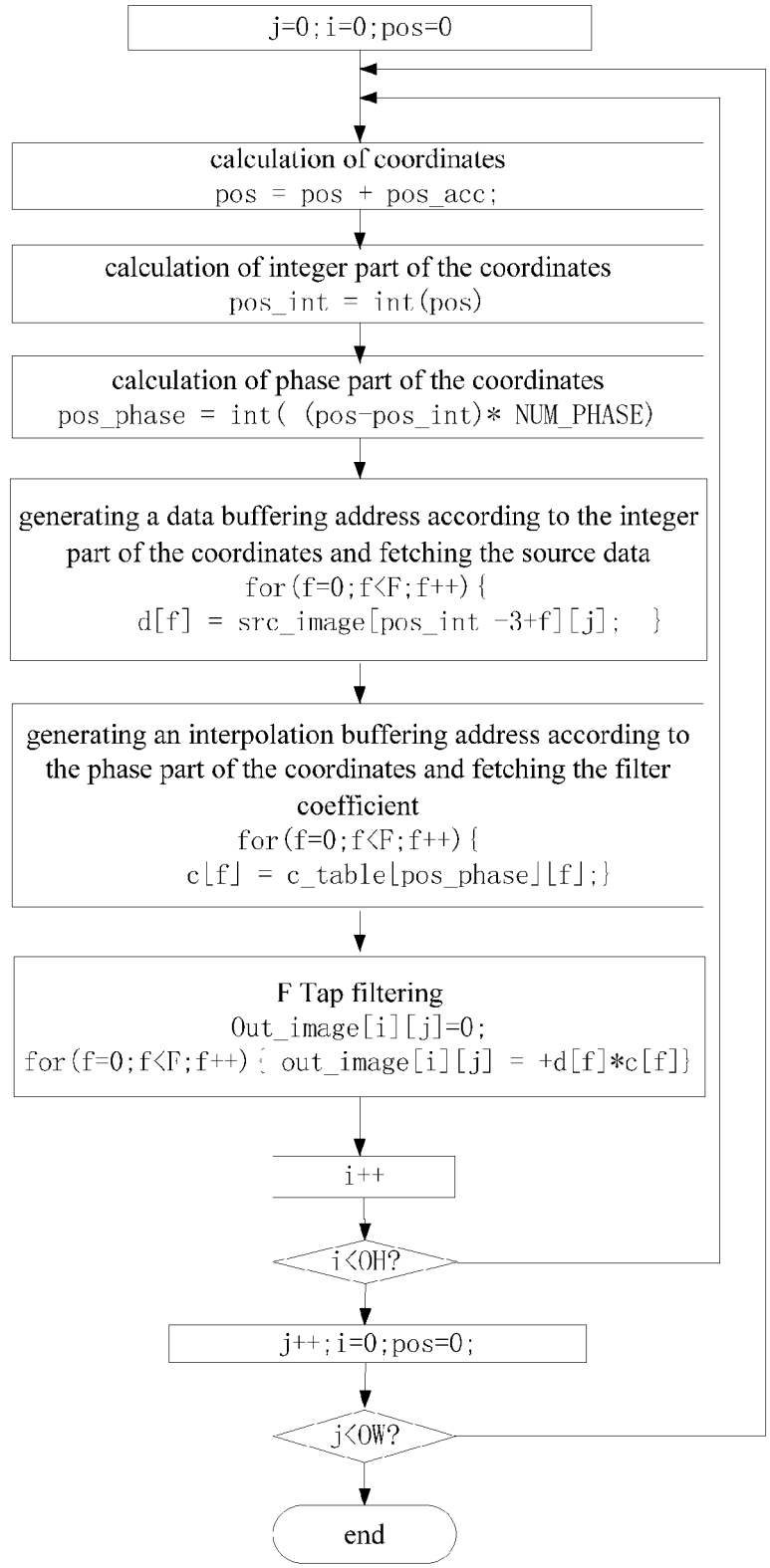
FIG. 3 is a flow chart of a conventional vertical interpolation algorithm for images.
Figure 4:
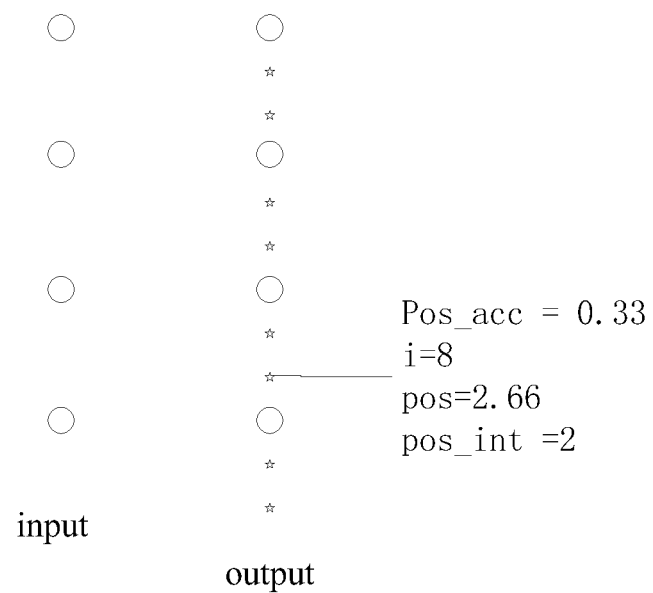
FIG. 4 illustrates symbols for calculation of image interpolation coordinates in the conventional vertical interpolation algorithm for images.
Figure 7A:
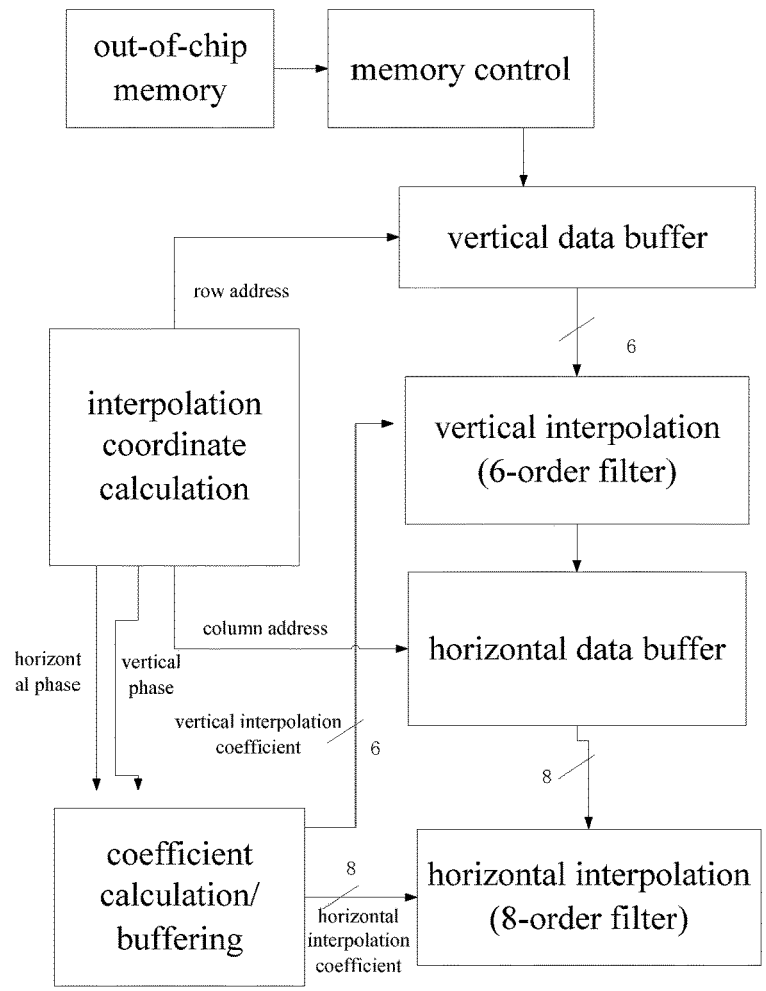
FIG. 7-a) is a circuit structure diagram of a conventional 2D-image polyphase interpolation circuit with fixed order filters (vertical 6-tap 5-order filter and horizontal 8-tap 7-order filter)
FIG. 7b) is a circuit structure of the conventional 6 tap 5-order interpolation filter.
FIG. 7c) is a circuit structure of the conventional 8-tap 7-order interpolation filter.
Figure 7B:
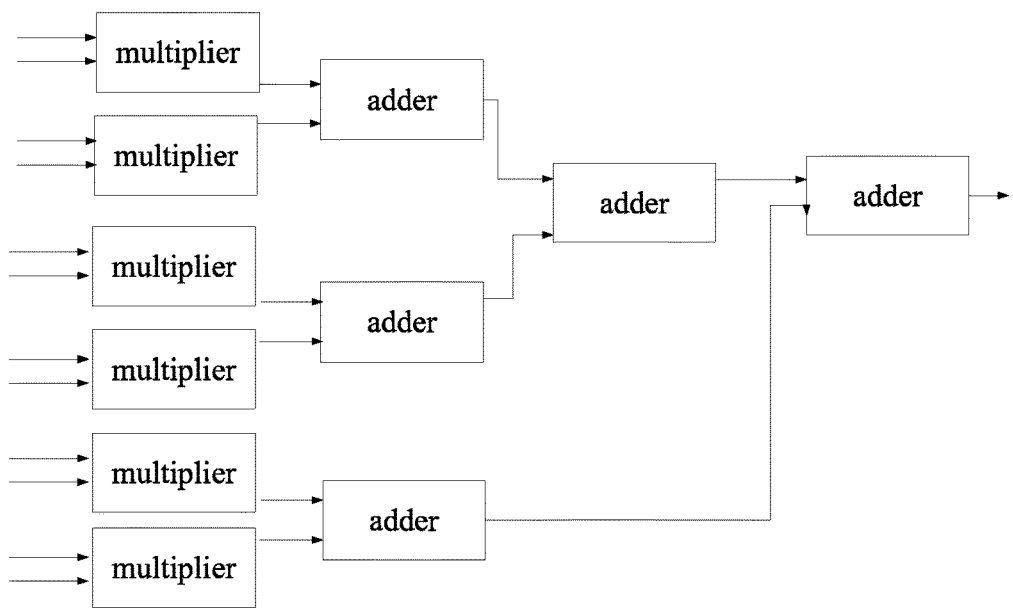
Figure 7C:
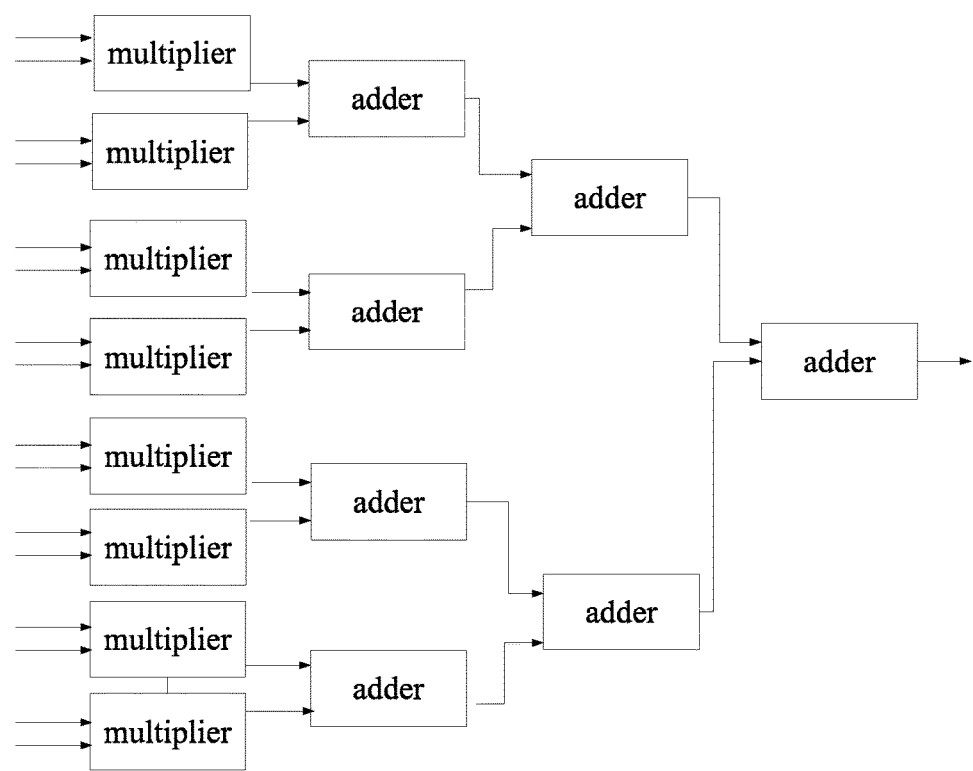

Optimization of the calculation process of the interpolation algorithm will be described below. As shown in FIG. 7-a), in a conventional two-dimensional image interpolation circuit, if only the vertical interpolation is inspected, then the corresponding interpolation algorithm is as shown in FIG. 3, wherein i and j are coordinates of the interpolation pixel in the output image, OW and OH are width and height of the output image, respectively. NUM_PHASE is a total number of phases of the interpolation filter group, and F−1 is the order of the filter. src_image is an input image, out_image is an output image, whose size is OW*OH; c_table is an interpolation filter coefficient table, whose size is NUM_PHASE*F, and there are NUM_PHASE table entries, each table entry being one F-tap filter corresponding to one phase.

pos is a position of the pixel at the position (i,j) of the output image in the source image, pos_acc is the step length of interpolation, and the meaning of the symbol is as shown in FIG. 4.

As shown in FIG. 3, the interpolation process needs to calculate the coordinates and phase for each pixel, thus generating a data buffering address and an interpolation coefficient buffering address. To simplify calculation, this embodiment optimizes the flow of the algorithm as shown in FIG. 3, and the main improvements are as follows:

First, the coordinates and interpolation coefficient are calculated and stored in advance and then interpolation is performed, so the process of pixel interpolation does not involve any calculation and it only needs to sequentially access the memories, because as far as a vertical magnification to 1080 is concerned, there are at most 1080 circumstances for the coordinates and the interpolation coefficient. For a magnification from 720×480 to 720×1080, calculation of the coordinates needs to be performed for 720×1080 times in the conventional method, while after the improvement, the calculation is reduced to 1080 times.

Second, calculation of coordinates and coefficients is performed using the simplest scaling ratio, which can further reduce calculation, for example, in the case of magnification from 720×480 to 720×1080, the vertical scaling ratio is 480->1080, but the simplest scaling ratio is 4->9, so the calculation of coordinates is further reduced to 9 times by using the simplest scaling ratio. The amount of calculation is greatly reduced. The coordinates and coefficient table may be calculated at one time as well by means of off-line calculation.

The relationship between the scaling ratio and the simplest scaling ratio is as shown in Table 1, wherein IH is input image height, OH is output image height, N is an input factor in the simplest scaling ratio, L is an output factor in the simplest scaling ratio, and loop is a ratio between the output image height and the simplest scaling ratio output factor.

TABLE 1

| Scaling ratio | Simplest scaling ratio | IH | OH | N | L | Loop = (OH/L) |
|---|---|---|---|---|---|---|
| 480->1080 | 4->9 | 480 | 1080 | 4 | 9 | 120 |
| 576->2160 | 4->15 | 576 | 2160 | 4 | 15 | 144 |

Figure 5:
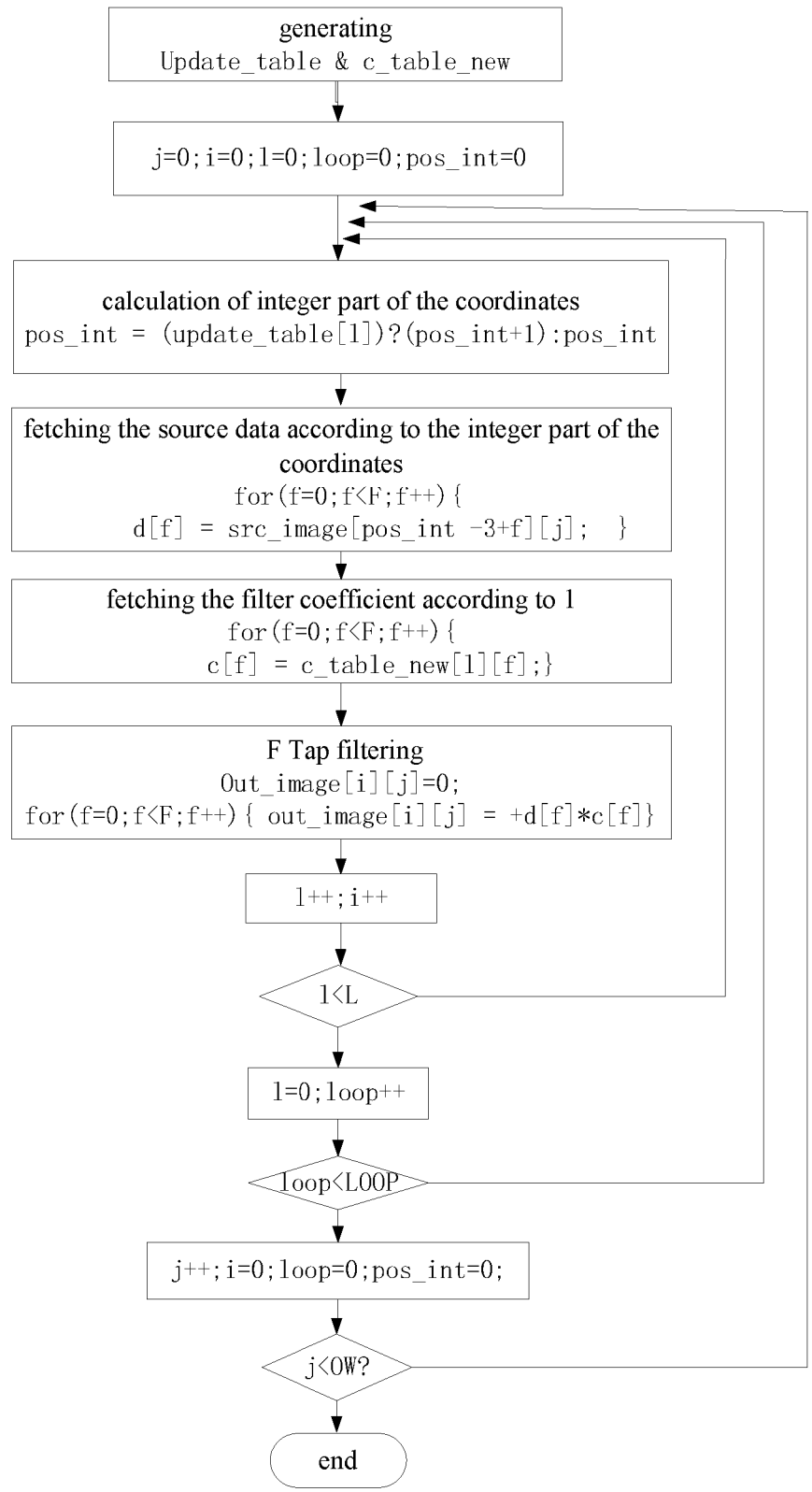
FIG. 5 is a flow chart of an optimized interpolation algorithm in embodiment 1 for the apparatus for parallel polyphase image interpolation according to the present invention.

As shown in FIG. 5, the differences between the flow of the optimized image interpolation algorithm and the conventional interpolation flow are as shown in Table 2:

TABLE 2

| Item | | Conventional interpolation flow | Optimized interpolation flow | Characteristics after optimization |
|---|---|---|---|---|
| | out-of-loop calculation | unnecessary | Yes, the coordinate update table update_table and the coefficient table c_table_new are pre-calculated | a very small amount of calculation is added out of the loop |
| in-loop calculation | calculation of integer part of the coordinates | pos = pos + pos_acc; pos_int = int(pos) | pos_int = (update_table[1])?(pos_int + 1): pos_int | The calculation is simpler, which is the conditional adding 1 |
| | calculation of phase of the coordinates | pos_phase = int((pos − pos_int)* NUM_PHASE) | none | Phase calculation is omitted |
| | source data buffering and reading | | identical | |
| | interpolation coefficient buffering and reading | for(f = 0; f < F; f++) { c[f] = c_table[pos_phase][f];} | for(f = 0; f < F; f++){ c[f] = c_table_new[l][f];} | Memory access becomes simpler, which changes from indexing into sequencing |
| | filtering | | identical | |

Figure 6:
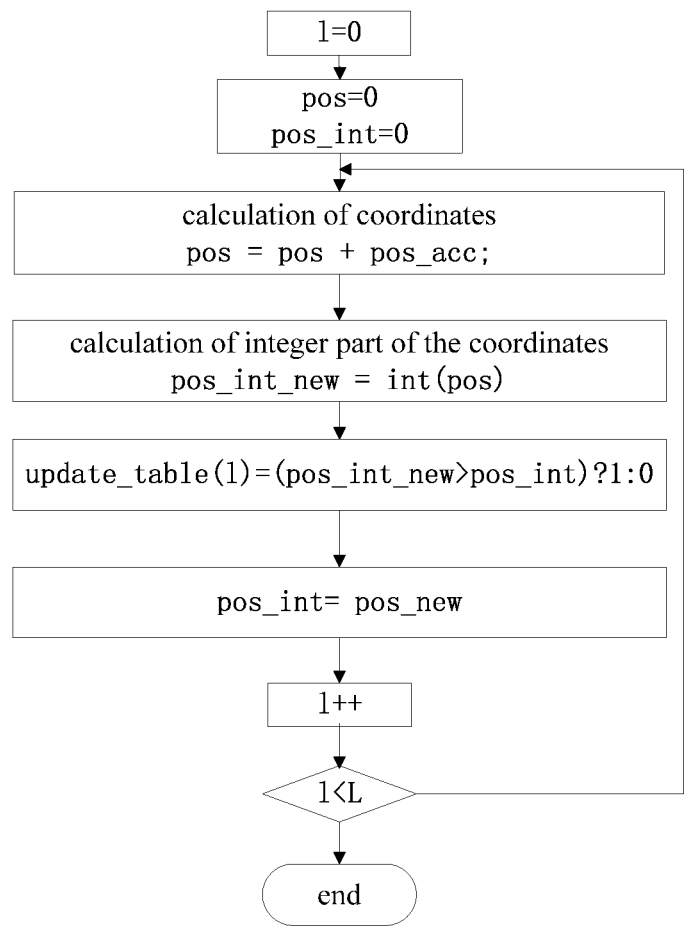
FIG. 6 is a flow chart of calculation of an update table in embodiment 1 for the apparatus for parallel polyphase image interpolation according to the present invention.

The process of calculation of the update table (update_table) is as shown in FIG. 6. It can be seen from FIG. 6 that the coordinate update table (update_table) includes L table entries, and only L loops are necessary for the calculation.

Figure 8:
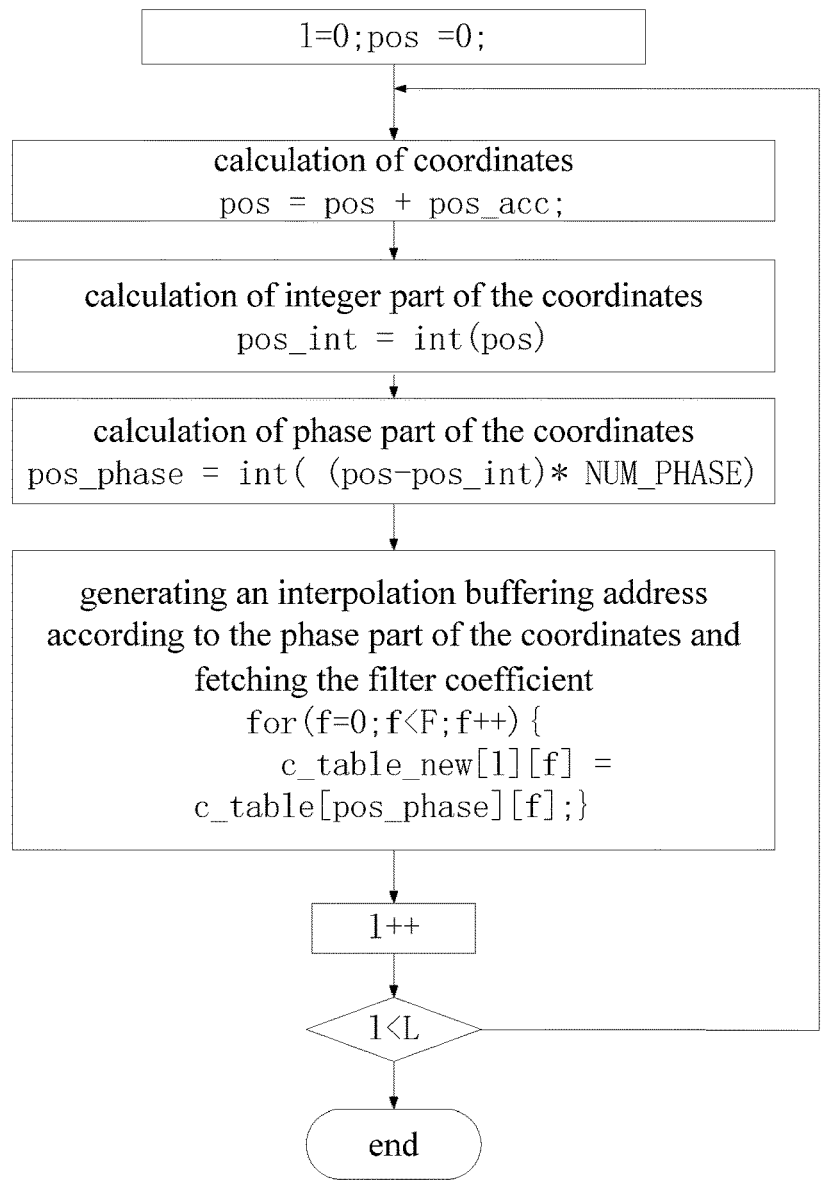
FIG. 8 shows a flow of calculation of a new interpolation filter coefficient table in embodiment 1 for parallel polyphase image interpolation according to the present invention.

The calculation of the new interpolation filter coefficient table c_table_new is as shown in FIG. 8. Suppose that the total number of phases NUM_PHASE of the interpolation filter group is 64, the tap number F of the filter is 6, then the size of the original interpolation filter coefficient table c_table is NUM_PHASE*F, i.e. a table of 64×6, which includes 64 table entries, each being a 6-Tap filter corresponding to a phase. The new interpolation filter coefficient table c-table_new has a size of L×F.

It can be seen from FIG. 6 that the coordinate update data update_table includes L table entries, and only L loops are necessary for the calculation.

The coordinate update table and interpolation filter coefficient table can be calculated either on-line or off-line, and in order to simplify the circuit structure, this embodiment adopts off-line calculation.

The circuit structure corresponding to the interpolation algorithm is described below. The hardware structure corresponding to the above-mentioned optimized interpolation algorithm is as shown in FIG. 1, and said reconfigurable apparatus for parallel polyphase image interpolation comprises a local memory for storing source image data, a filter coefficient group and interpolated image data; a state machine for generating control signals for controlling the respective units; a memory access control unit 0 for reading the source image data in the local memory into the data buffering unit; a memory access control unit 1 for reading the filter coefficients in the local memory into the interpolation filter coefficient buffering unit; a data buffering unit for buffering F rows of source image data needed for interpolating a row of images (F−1 being the order of the interpolation filter, which is reconfigurable), each clock cycle outputting a row of source image data with a row width of P pixels, which are input into P multiply-accumulators (MAC), respectively; an interpolation filter coefficient buffering unit for buffering F filter coefficients needed for interpolating a row of data, each clock cycle outputting one filter coefficient and broadcasting it to P multiply-accumulators; P multiply-accumulators for receiving input image data and filter coefficients to perform multiply-accumulation operation, and every F clock cycles outputting a row of P interpolation results; a memory access control unit 2 for writing the output from the multiply-accumulator (MAC) back to the local memory.

The interpolation apparatus shown in FIG. 1 supports filters with any order, and it is different from the conventional two-dimensional image interpolation circuit, as shown in FIG. 7-a), which has both a vertical interpolation filter circuit and a horizontal interpolation filter circuit. In this embodiment, the method of time-multiplexing the same set of interpolation circuits by vertical interpolation and horizontal interpolation is used.

In order to multiplexing the same set of interpolation circuits, the conventional method is as follows:
Step 1: vertically interpolating the image and writing the temporary image result back to the memory;
Step 2: transposing the temporary image;
Step 3: interpolating the transposed temporary image in a vertical direction and writing it back to the memory;
Step 4: transposing the result generated from step 3 to obtain a final result.

In this conventional method, a large time overhead will be generated in the transposing step, so in order to multiplex the uniform circuits and interpolate, and to avoid transposing overhead, this embodiment uses a two-dimensional discrete memory. As for the implementation of the two-dimensional discrete memory, reference can be made to the patent "multi-granularity parallel storage system and storage"; said memory can support both the row read mode and the column read mode. In the row read mode, a row of P data may be read in each clock cycle to perform interpolation in a vertical direction; and in the column read mode, a column of P data may be read in each clock cycle to perform interpolation in a horizontal direction, therefore, the method for performing two-dimensional image interpolation in the present patent is as follows:
Step 1: setting the read mode of the local memory into a row read mode and setting the write-back mode into row write-back.

Step 2: generating a read control signal by the memory access control unit 0 to the local memory and reading data from the local memory according to the row read mode and interpolating in a vertical direction.

Step 3: generating a row-write-back write control signal by the memory access control unit 2 to the local memory, and writing the data generated in step 2 back to the local memory according to the row-write-back mode.

Step 4: setting the read mode of the local memory into a column read mode and setting the write-back mode into column-write-back.

Step 5: generating a read control signal by the memory access control unit 0 to the local memory, and reading the data wrote back to the local memory in step 3 according to the column read mode, and interpolating in a horizontal direction.

Step 6: generating a write control signal by the memory access control unit 2 to the local memory, and writing the data generated in step 5 back into the local memory according to the column write-back mode.

The apparatus and method for performing vertical interpolation and horizontal interpolation by multiplexing the same set of circuits in the present patent use a simple configuration to realize different ways of reading and writing-back, so little time is needed for configuration and the time overhead for image transposition is avoided.

The same set of circuits is multiplexed in vertical interpolation and horizontal interpolation, so except for the difference in the read and write-back mode, the rest aspects are all the same. In this case, for ease of exposition, only the interpolation in the vertical direction is discussed below, and F=6 and P=4 are used as an example; wherein the value of P determines the degree of parallelism and can be selected according to the timing requirement. However, once P is fixed and designed as hardware, the value of P is unchangeable; as for the number of taps F of the interpolation filter, it can be modified by configuration after fixing the hardware.

Figure 9A:
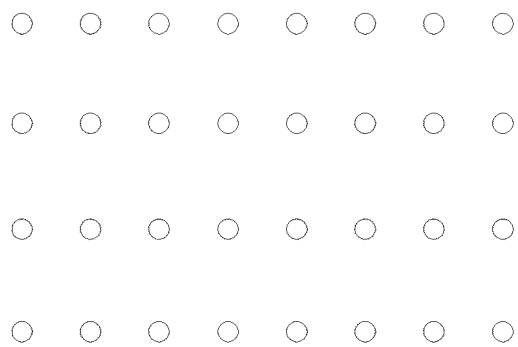
FIG. 9-a) is a schematic drawing of source image pixels.

The sequence of processing of the image interpolation data is as shown in FIG. 9. FIG. 9-*a*) is a source image with a size of 8×4, FIG. 9-*b*) is the interpolated image with a size of 8×12, wherein the circles represent the pixel points existing in the source image, the stars represent interpolated pixel points. In order to obtain the interpolated image as shown in FIG. 9-*b*), the processing sequence in the present patent is as shown in FIG. 9-*c*), i.e. 4 pixels can be processed in parallel each time, then moving downward to the next row.

Figure 10:
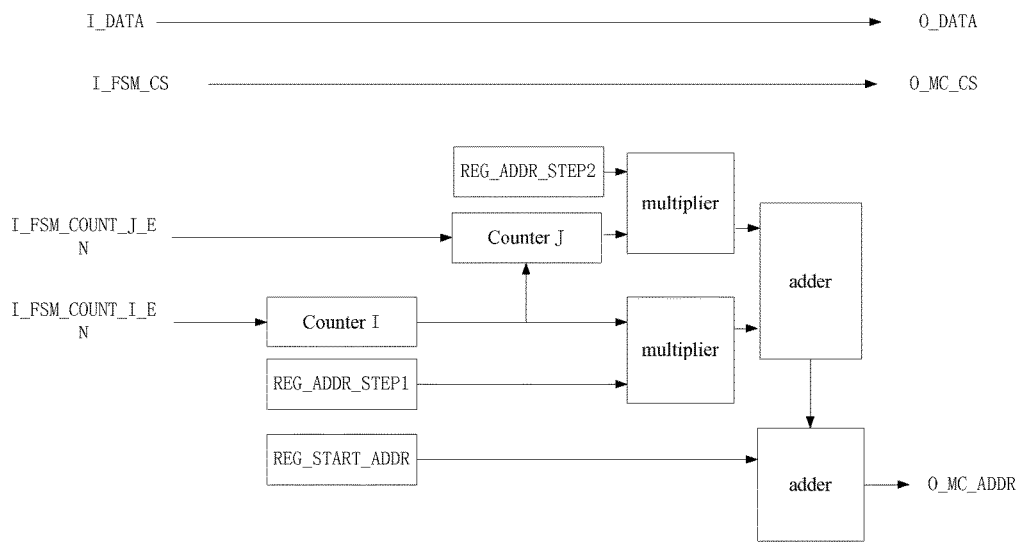
FIG. 10 is a block diagram of each memory access control unit.

The local memory in the interpolation apparatus as shown in FIG. 1 has a row mode and a column mode, and the structure of the memory access control unit 0 in said interpolation apparatus is as shown in FIG. 10.

Each memory access control unit consists of a counter i, a counter j, two multipliers, two adders and a configuration register. The memory access control unit receives a chip-select signal I_FSM_R_CS from the state machine and a counter enable signal, and outputs a chip-select signal O_MC_CS and an address O_MC_ADDR to the local memory; receives data input I_DATA and outputs O_DATA; wherein REG_START_ADDR, REG_ADDR_STEP1, REG_ADDR_STEP2 are configuration registers; wherein counter I counts the Clock. When the input counter enable signal I_FSM_COUNT_EN_I=1, at each clock, counter I is incremented by 1 and a re-counting starts from zero when it counts to REG_COUNT_NUMBER_I-1. Counter J counts the outputs of counter I, when I_FSM_COUNT_EN_J=1, and the output of counter I changes from REG_COUNT_NUMBER_I-1 into zero, the counter J is incremented by 1; a re-counting starts from zero when it counts to REG_COUNT_NUMBER_J-1.

Figures 9B, 9C, 9D:
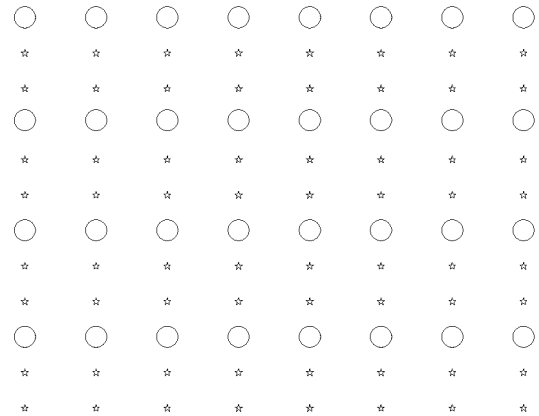

By means of the memory access control unit 0 as shown in FIG. 10, addresses can be generated according to the sequence shown in FIG. 9*d*). At each clock when the read chip-select signal is enabled, the memory access control unit can read data with a bit width of 64 bits (16 bit*4), which includes four source image data pixels. If the image is magnified from 720×480 into 720×1080, then the register configuration is as shown in Table 3:

TABLE 3

| Register | Value | Note |
|---|---|---|
| REG_ADDR_STEP1 | 720 | =input image width |
| REG_ADDR_STEP2 | 4 | =P |
| REG_COUNT_NUMBER_I | 480 | =input image height |
| REG_COUNT_NUMBER_J | 180 | =input image width/P |

The local memory stores the interpolation filter coefficient table c_table_new. The memory access control unit 1 in the interpolation apparatus as shown in FIG. 1 loads the interpolation filter coefficient table into the interpolation filter coefficient buffer; and the circuit structure thereof is the same as that of the memory access control unit 0, but the register configuration thereof is different, as shown in table 4:

TABLE 4

| Register | Value | Note |
|---|---|---|
| REG_ADDR_STEP1 | 4 | =degree of parallelism P |
| REG_ADDR_STEP2 | 0 | |
| REG_COUNT_NUMBER_I | 9 | =output factor L in the simplest scaling ratio |
| REG_COUNT_NUMBER_J | 0 | |

The memory access control unit 2 in the interpolation apparatus as shown in FIG. 1 writes the output image back to the local memory, and the circuit structure thereof is the same as that of the memory access control unit 0. The register configuration thereof is as shown in table 5:

TABLE 5

| Register | Value | Note |
|---|---|---|
| REG_ADDR_STEP1 | 720 | =output image width |
| REG_ADDR_STEP2 | 4 | =P |
| REG_COUNT_NUMBER_I | 1080 | =output image height |
| REG_COUNT_NUMBER_J | 180 | =input image width/P |

Figure 11:
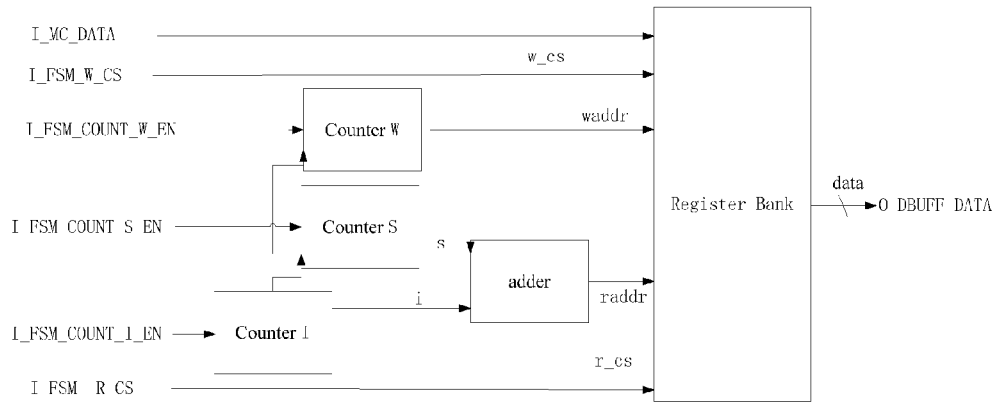
FIG. 11 is a block diagram of data buffering in embodiment 1 for the apparatus for parallel polyphase image interpolation according to the present invention.

FIG. 11 shows the data buffering circuit structure in the interpolation apparatus as shown in FIG. 1. The data buffering circuit structure consists of a counter W, a counter S, a counter I, an adder and a register bank as well as a configuration register. Wherein the register bank includes 32 registers with a bit width of P*BW, P is the degree of parallelism, BW is the bit width of each image pixel. When the input I_FSM_CS_R signal is 1, the register identified by raddr is selected from the registers in the register bank for outputting, the output O_DBUFF_DATA has a bit width of P*BW The read address raddr is calculated as raddr=s+i; wherein s is the output of counter S, i is the output of counter I. When the input I_FSM_W_CS is 1, the input I_MC_DATA is written into the register identified by waddr in the register bank, and the write address waddr is the output of counter W. Configuration of the configuration register in the data buffering area is as shown in Table 6. Counter I counts the clock, when the input enable signal I_FSM_COUNT_I_EN=1, the count starts, and when it counts to REG_COUNT_I_NUMBER-1, a recounting starts from zero. Counters S and W count the outputs of counter I, when the output of counter I is REG_COUNT_NUMBER-1, the counter is incremented by 1.

TABLE 6

| Register | Value | Note |
| --- | --- | --- |
| REG_COUNT_NUMBER_W | 6 | =filter order + 1 = F |
| REG_COUNT_NUMBER_S | 6 | =filter order + 1 = F |
| REG_COUNT_NUMBER_I | 6 | =filter order + 1 = F |

It can be seen that when the filter has 6 taps, only 6 registers out of the 32 registers are used.

Figure 12:
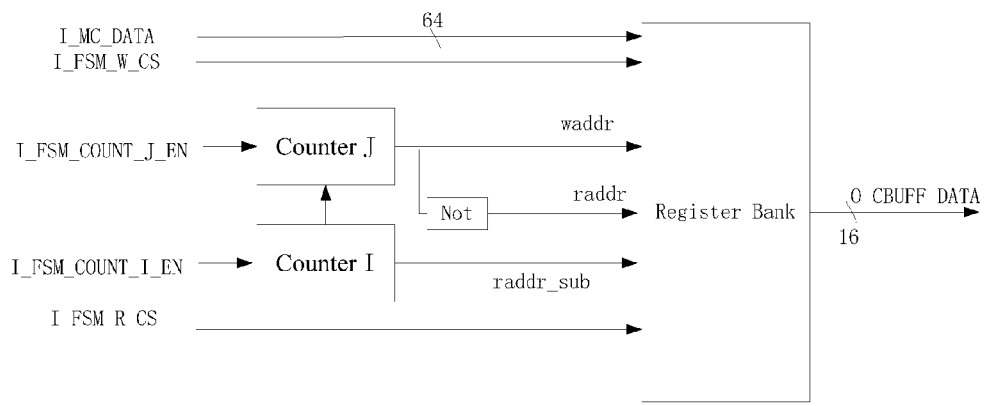
FIG. 12 is a block diagram of an interpolation coefficient buffering circuit in embodiment 1 for the apparatus for parallel polyphase image interpolation according to the present invention.

FIG. 12 shows the coefficient buffering unit circuit structure in the interpolation apparatus as shown in FIG. 1, the interpolation coefficient buffering circuit structure consists of a counter I, a counter J, a NOT gate and a register bank; the register bank only uses two registers, each having a width of P*BW, P is the degree of parallelism and BW is the bit width of each image pixel, which is 16*4=64 bits in this embodiment; and such an apparatus can realize the function of double buffering. When the input write enable signal I_FSM_W_CS is 1, the input data 64 bit I_MC_DATA is written into the register identified by waddr. raddr is a read address, which indicates the identifier of the register being read, and raddr_sub indicates a specific field among the P fields of a register; namely, when the input read enable signal I_FSM_R_CS is 1, data in the sub field raddr_sub in the register identified by raddr is output, and the bit width of the output data O_CBUFF_DATA is BW=16 bits. Wherein, the relationship between the read address raddr and the write address waddr is waddr=not raddr. When the input count enable signal I_FSM_COUNT_I_EN is 1, the counter I counts the clock, and when I_FSM_COUNT_J_EN=1, the counter counts the output of the counter I; the configuration of the coefficient buffering area is as shown in table 7:

TABLE 7

| Register | Value | Note |
| --- | --- | --- |
| REG_COUNT_NUMBER_J | 2 | =2 (double buffering) |
| REG_COUNT_NUMBER_I | 6 | =filter order + 1 = F |

Figure 13:
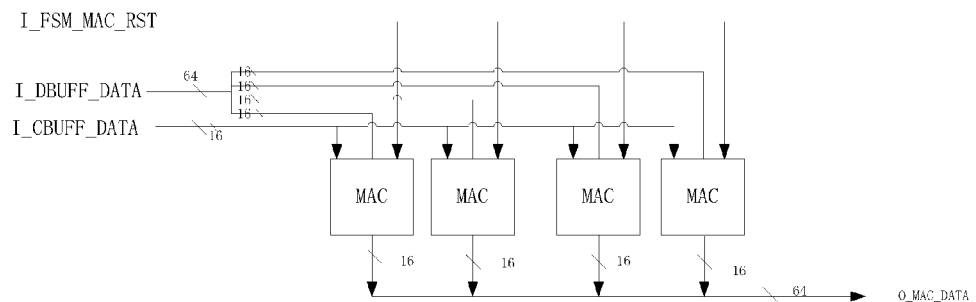
FIG. 13 is a structure diagram of an MAC array in embodiment 1 for the apparatus for parallel polyphase image interpolation according to the present invention.

FIG. 13 shows the structure of the MAC array in the interpolation apparatus as shown in FIG. 1, each MAC receives an input of 16 bits of data from I_DBUFF_DATA and an input of I_CBUFF_DATA to perform a multiply-accumulation operation, I_FSM_MAC_RST is a reset signal. When I_FSM_MAC_RST=1, a result of O_MAC_DATA is output and the accumulation register is reset to zero The local memory has three independent memories port0, port1 and port2, which can be read and written respectively. When the memory is used to be read, the address and read chip-select signal are input and data are output; and when the memory is used to be written, the address and write chip-select signal are input and data are written.

Figure 14:
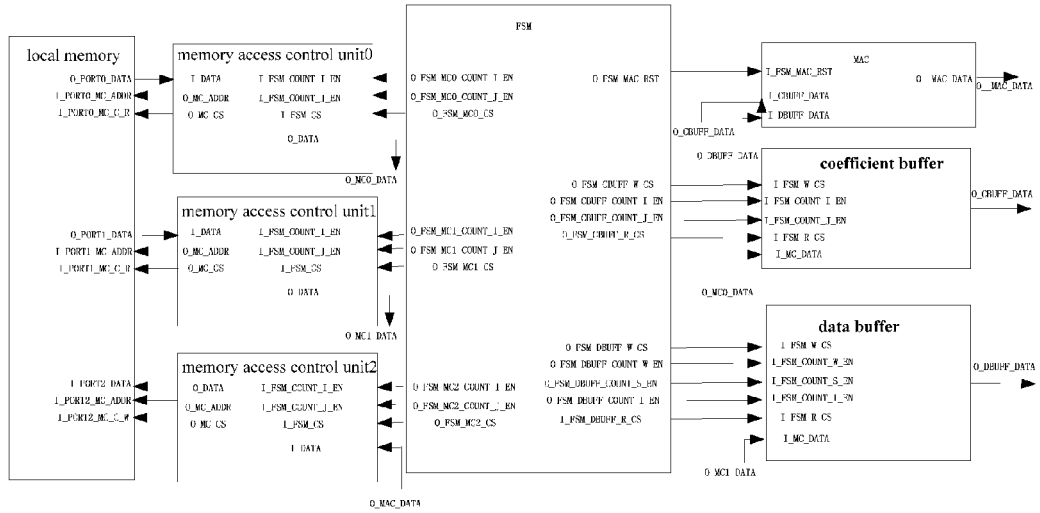
FIG. 14 shows the connection diagram of components of the interpolation apparatus in embodiment 1 for the apparatus for parallel polyphase image interpolation according to the present invention.

The state machine FSM in the interpolation apparatus as shown in FIG. 1 generates control signals for each of the rest components. FIG. 14 shows a connection logic of the components in the interpolation apparatus as shown in FIG. 1; wherein FSM generates control signals.

Figure 15:
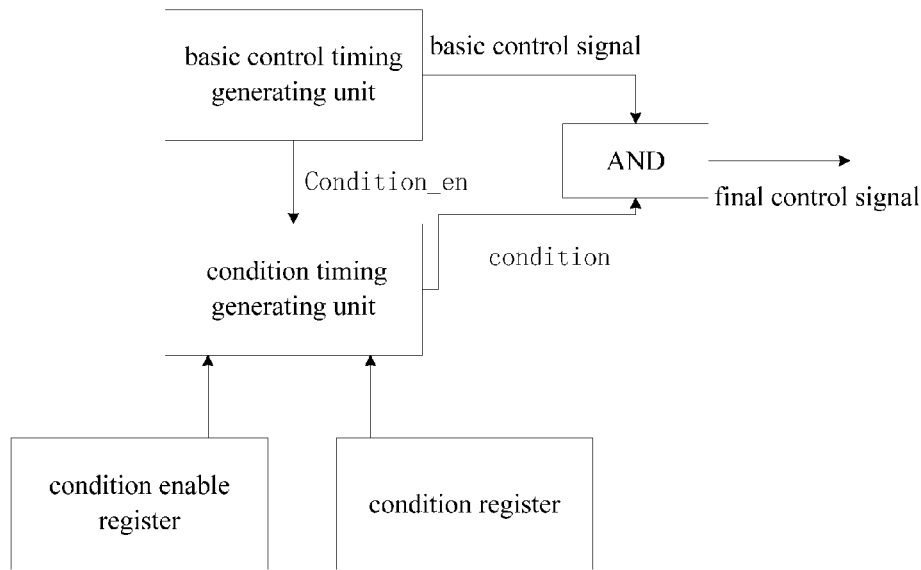
FIG. 15 is a structure diagram of the circuit of a state machine FSM in embodiment 1 for the apparatus for parallel polyphase image interpolation according to the present invention.

The structure of FSM is as shown in FIG. 15, which includes a basic control timing generating unit and condition timing generating unit, a condition enable register, a condition register. The basic control timing generating unit generates a basic timing for the control signals and generates condition enable control signal to the condition timing generating unit. The condition timing generating unit reads one bit of the condition register and one bit of the condition enable register when the condition enable signal is 1, and to generate the final condition.

Figure 16:
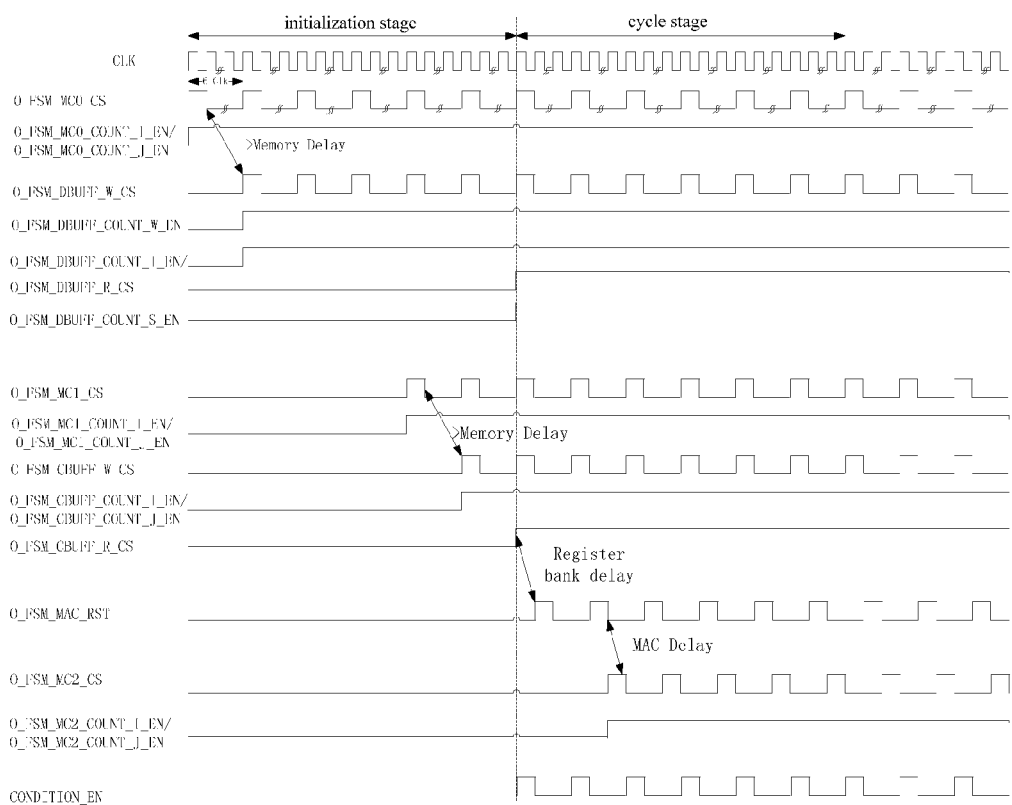
FIG. 16 is a timing chart of output signals generated by a basic control timing generating unit in embodiment 1 for the apparatus for parallel polyphase image interpolation according to the present invention.

The timing of the output signals generated by the basic control timing generating unit is as shown in FIG. 16. FSM outputs 19 control signals altogether, suppose that the output of FSM is O_FSM_OUT, which has 19 bits, and the control signal represented by each bit is as shown in Table 8, and the output signal generated by the basic control timing generating unit is fsm_basic.

TABLE 8

| Bit[0] | O_MC0_CS |
| --- | --- |
| Bit[1] | O_FSM_MC0_COUNT_I_EN |
| Bit[2] | O_FSM_MC0_COUNT_J_EN |
| Bit[3] | O_FSM_DBUFF_W_CS |
| Bit[4] | O_FSM_DBUFF_COUNT_W_EN |
| Bit[5] | O_FSM_DBUFF_COUNT_I_EN |
| Bit[6] | O_FSM_DBUFF_R_CS |
| Bit[7] | O_FSM_DBUFF_COUNT_S_EN |
| Bit[8] | O_FSM_MC1_CS |
| Bit[9] | O_FSM_MC1_COUNT_I_EN |
| Bit[10] | O_FSM_MC1_COUNT_J_EN |
| Bit[11] | O_FSM_CBUFF_W_CS |
| Bit[12] | O_FSM_CBUFF_COUNT_I_EN |
| Bit[13] | O_FSM_CBUFF_COUNT_J_EN |
| Bit[14] | O_FSM_CBUFF_R_CS |
| Bit[15] | O_FSM_MAC_RST |
| Bit[16] | O_FSM_MC2_CS |
| Bit[17] | O_FSM_MC2_COUNT_I_EN |
| Bit[18] | O_FSM_MC2_COUNT_J_EN |

The condition enable register REG_CONDITION_EN includes 19 bits, each bit representing whether the corresponding control signal is controlled by the condition. In this embodiment, only the four control signals of O_FSM_DBUFF_W_CS, O_FSM_DBUFF_COUNT_S_EN, O_FSM_DBUFF_COUNT_W_EN, and O_FSM_MCO_CS are controlled by the condition, and their corresponding bit is 1, while the rest bits are 0, so the value of REG_CONDITION_EN is 153.

In the jth cycle of L cycles (0<=j<L), the generation logic for condition is
condition(i)=(condition_en=1)REG_CONDITION_EN(i)* REG_CONDITION(j): 1;
finally, the output of FSM is:
O_FSM_OUT(i)=fsm_basic(i) & condition(i).

The condition register REG_CONDITION has totally 1024 bits, wherein only L bits are valid (L being the output factor in the simplest scaling ratio); and the values of said L bits are the coordinate update table update_table as shown in FIG. 6.

The apparatus for parallel polyphase image interpolation according to the present invention supports polyphase filters with any order, and it can realize reconfiguration of the interpolation apparatus only by re-configuring the hardware without changing the hardware, thereby realizing interpolation scaling of different image data, namely, a reconfigurable apparatus for parallel polyphase image interpolation is realized, which can meet the needs for different application scenarios.

Figure 2:
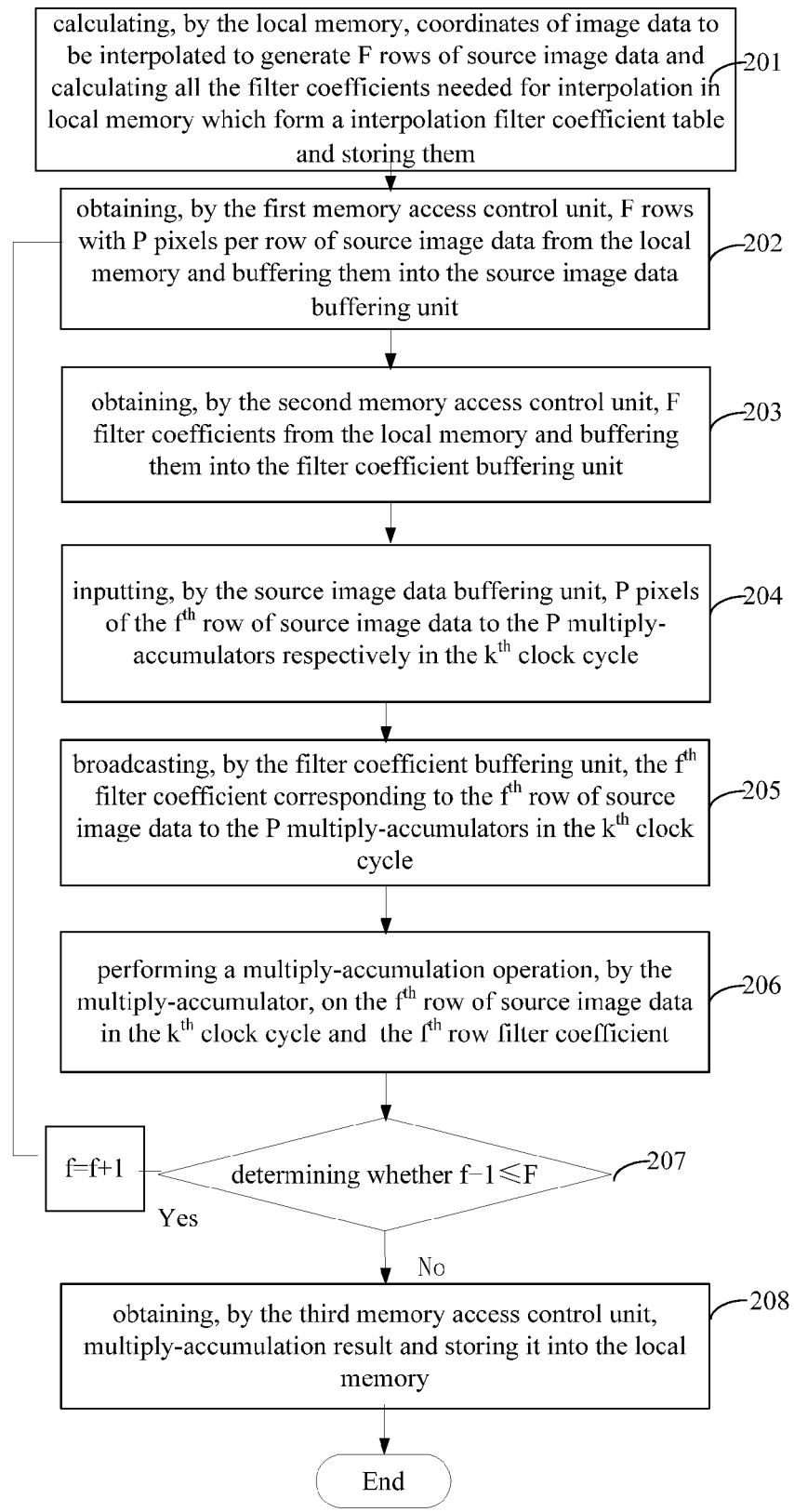
FIG. 2 is a flow chart of embodiment 1 for the method for parallel polyphase image interpolation according to the present invention.

FIG. 2 is a flow chart of embodiment 1 for a method for parallel polyphase image interpolation according to the present invention. As shown in FIG. 2, in the method for parallel polyphase image interpolation according to the present invention comprises:

S201: calculating, by the local memory, coordinates of image data to be interpolated to generate F rows of source image data, and calculating all the filter coefficients needed for interpolation in local memory which form a interpolation filter coefficient table and storing them;

Preferably, the local memory calculates coordinates of image data to be interpolated to generate F rows of source image data, and calculating all the filter coefficients needed for interpolation in local memory which form a interpolation filter coefficient table and storing them, which comprises:

calculating, by the local memory according to the simplest scaling ratio, coordinates of image data to be interpolated to generate F rows of source image data and calculating all the filter coefficients needed for interpolation in local memory which form a interpolation filter coefficient table and storing them;

S202: obtaining, by the first memory access control unit, F rows with P pixels per row of source image data from the local memory and buffering them into the source image data buffering unit;

S203: obtaining, by the second memory access control unit, F filter coefficients from the local memory and buffering them into the filter coefficient buffering unit;

S204: inputting, by the source image data buffering unit, P pixels of the $f^{th}$ row of source image data to the P multiply-accumulators in the $k^{th}$ clock cycle;

S205: broadcasting, by the filter coefficient buffering unit, the $f^{th}$ filter coefficient corresponding to the $f^{th}$ row of source image data to the P multiply-accumulators in the $k^{th}$ clock cycle;

S206: performing a multiply-accumulation operation, by the multiply-accumulator, on the $f^{th}$ row of source image data in the $k^{th}$ clock cycle and the $f^{th}$ filter coefficient, and outputting the multiply-accumulation result and reset the accumulation register when f=F;

S207: determining whether f+1 ≤ F, if yes, adding 1 to f and repeating the operation for the $f^{th}$ row until f+1>F, and obtaining the i multiply-accumulation result in the $k^{th}$ clock cycle as the interpolation result of P destination image pixels;

S208: obtaining, by the third memory access control unit, said multiply-accumulation result and storing it into the local memory;

wherein k ⩾ 1, F ⩾ 1, 1 ⩽ f ⩽ F.

Repeat the said processing for P destination image pixels until all the destination image pixels are processed The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The above aspects of the disclosure can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and modules are implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the aspects of the disclosure of the present disclosure.

It shall be noted that the above embodiments are only for illustrating rather than limiting the technical solution of the present invention. Although the invention has been described in detail with reference to the above embodiments, those ordinarily skilled in the art shall understand that the technical solutions recited in the above embodiments can be modified, or some or all technical features thereof may be substituted equivalently; while such modifications or substitution do not make the corresponding technical solutions to be substantively departing from the scope of the technical solutions in the embodiments of the present invention.

What is claimed is:

1. An apparatus for parallel polyphase image interpolation, characterized by comprising:
   a local memory for storing source image data and filter coefficients and destination image data;
   a first memory access control unit for obtaining F rows with P pixels per row of source image data from the local memory and buffering the F rows of source image data into a source image data buffering unit;
   a second memory access control unit for obtaining F filter coefficients from the local memory and buffering the F filter coefficients into a filter coefficient buffering unit;
   the source image data buffering unit is configured for inputting P pixels of a $f^{th}$ row of source image data to P multiply-accumulators respectively in a $k^{th}$ clock cycle;
   the filter coefficient buffering unit is configured for broadcasting a $f^{th}$ filter coefficient corresponding to the $f^{th}$ row of source image data to P multiply-accumulators in the $k^{th}$ clock cycle;
   the multiply-accumulator is configured for performing multiply-accumulation operation on the $f^{th}$ row of source image data in the $k^{th}$ clock cycle and the $f^{th}$ filter coefficient and outputting the multiply-accumulation result and reset the accumulation register when f=F;
   a third memory access control unit for obtaining the multiply-accumulation result and storing it into the local memory;
   a state machine for outputting control signals to the first memory access control unit, the second memory access control unit, the third memory access control unit, the source image data buffering unit, and the filter coefficient buffering unit;
   wherein, k ⩾ 1, F ⩾ 1, P>1, 1 ⩽ f ⩽ F.

2. The apparatus for parallel polyphase image interpolation according to claim 1, characterized in that: the local memory is further configured for calculating coordinates of the image data to be interpolated to generate F rows of source image data, and for calculating all the filter coefficients needed for interpolation in local memory which form a interpolation filter coefficient table and storing them;

the first memory access control unit is further used for calculating the address of the source image data in the local memory, and reading the source image data;

the second memory access control unit is used for calculating the address of the F filter coefficients in the local memory and reading the filter coefficients.

3. The apparatus for parallel polyphase image interpolation according to claim 2, characterized in that the local memory is further configured for calculating coordinates of the image data to be interpolated according to a simplest scaling ratio to generate F rows of source image data, and for calculating all the filter coefficients needed for interpolation in local memory which form a interpolation filter coefficient table and storing them, the interpolation filter coefficient table has L table entries and each entry corresponds to a filter with F coefficients. L is the output factor of a simplest scaling ratio, and F is the number of taps of each filter, and filters are arranged in an order of the interpolation time when the filter is used;

the first memory access control unit is further used for calculating the address of the source image data in the local memory according to a coordinate update table, and reading the source image data;

the second memory access control unit 1 is further used for calculating the address of the F filter coefficients in the local memory according to the interpolation time when the filter is used, and reading the filter coefficients.

4. The apparatus for parallel polyphase image interpolation according to claim 1, characterized in that the local memory is a two-dimensional discrete memory.

5. The apparatus for parallel polyphase image interpolation according to claim 1, characterized in that the first memory access control unit, the second memory access control unit or the third memory access control unit comprises at least one counter, at least one multiplier, at least one adder and at least one configuration register.

6. The apparatus for parallel polyphase image interpolation according to claim 1, characterized in that the source image data buffering unit comprises at least one counter, at least one adder, at least one register bank and at least one configuration register.

7. The apparatus for parallel polyphase image interpolation according to claim 1, characterized in that the filter coefficient buffering unit comprises at least one counter, at least one NOT gate and at least one register bank.

8. A method for parallel polyphase image interpolation, characterized by comprising:

obtaining F rows of source image data from the local memory and buffering the F rows of source image data into a source image data buffering unit by a first memory access control unit;

obtaining F filter coefficients from the local memory and buffering the F filter coefficients into a filter coefficient buffering unit by a second memory access control unit;

inputting, by the source image data buffering unit, P pixels of a $f^{th}$ row of source image data to P multiply-accumulators respectively in a $k^{th}$ clock cycle;

broadcasting, by the filter coefficient buffering unit, a $f^{th}$ filter coefficient corresponding to the $f^{th}$ row of source image data to P multiply-accumulators in the $k^{th}$ clock cycle;

performing, by the multiply-accumulator, multiply-accumulation operation on the $f^{th}$ row of source image data in the $k^{th}$ clock cycle and the $f^{th}$ filter coefficient, and outputting the multiply-accumulation result and reset the accumulation register when f=F;

obtaining, by the third memory access control unit, the multiply-accumulation result and storing it into the local memory;

determining if f+1 ≤ F, if yes, adding 1 to f and repeating the operation to the $f^{th}$ row until f+1>F, and obtaining the multiply-accumulation result of the $k^{th}$ clock cycle as an interpolation result of P destination image pixels;

wherein, k ≥ 1, F ≥ 1, 1 ≤ f ≤ F.

Repeat the said processing for P destination image pixels until all the destination image pixels are processed.

9. The method for parallel polyphase image interpolation according to claim 8, characterized in that before obtaining, by a first memory access control unit, F rows of source image data from the local memory and buttering the F rows of source image data into a source image data buffering unit, the method further comprises: calculating, by the local memory, coordinates of image data to be interpolated to generate F rows of source image data and calculating all the filter coefficients needed for interpolation in local memory which form a interpolation filter coefficient table and storing them.

10. The method for parallel polyphase image interpolation according to claim 8, characterized in that calculating, by the local memory, coordinates of image data to be interpolated to generate F rows of source image data and calculating all the filter coefficients needed for interpolation in local memory which form a interpolation filter coefficient table and storing them comprises:

calculating, by the local memory according to the simplest scaling ratio, coordinates of image data to be interpolated to generate F rows of source image data and calculating all the filter coefficients needed for interpolation in local memory which form a interpolation filter coefficient table and storing them.

* * * * *

UNITED STATES PATENT AND TRADEMARK OFFICE
CERTIFICATE OF CORRECTION

PATENT NO. : 10,332,239 B2
APPLICATION NO. : 15/557086
DATED : June 25, 2019
INVENTOR(S) : Ruoshan Guo et al.

It is certified that error appears in the above-identified patent and that said Letters Patent is hereby corrected as shown below:

On the Title Page

Item (73) Assignee reads:
"INSTITUTE OF AUTOMATION CHINESE ACADEMY OF SCIENCES, Beijing (CN)"
Should read:
--Beijing Smartlogic Technology Ltd., Yancun Town, (CN)--

Signed and Sealed this
Thirty-first Day of March, 2020

Andrei Iancu
*Director of the United States Patent and Trademark Office*